ENDLESS TAPE CARTRIDGE

Original Filed Nov. 21, 1963

INVENTOR.

Howard W. Cole, Jr.

BY Sandoe, Neill, Schottler & Wikstrom

ATTORNEYS

ENDLESS TAPE CARTRIDGE

Original Filed Nov. 21, 1963

INVENTOR.

BY Howard W. Cole, Jr.

Sandoe, Hill, Sekotter & Wikstrom

ATTORNEYS

United States Patent Office 3,442,462
Patented May 6, 1969

3,442,462

ENDLESS TAPE CARTRIDGE

Howard W. Cole, Jr., Mountain Lakes, N.J., assignor to Torque Industries, Inc., Newark, N.J., a corporation of New Jersey Application Nov. 21, 1963, Ser. No. 325,301, now Patent No. 3,285,527, dated Nov. 15, 1966, which is a continuation-in-part of application Ser. No. 73,789, Dec. 5, 1960. Divided and this application Sept. 21, 1966, Ser. No. 581,010

Int. Cl. B65h *17/48*

U.S. Cl. 242—55.19 3 Claims

ABSTRACT OF THE DISCLOSURE

This specification discloses a cartridge for tape, such as sound-recording magnetic tape. The tape is in an endless spiral reel with the tape from the inner convolution of the reel passing directly and freely from the reel to a chamber of the cartridge where the tape can be advanced past a recording and reproducing head. The entire length of the tape is in the cartridge, and in the preferred embodiment there is a second driving means in the cartridge for advancing the tape. This second driving means includes a drum with which the tape has frictional engagement as it travels from the capstan back to the outside of the reel. This makes the capstan control the speed of the other driving means by determining the speed at which tape can come to the friction drum of the second driving means.

*Summary of the invention*

This application is a division of my application Ser. No. 325,301, filed Nov. 21, 1963, now Patent No. 3,285,527; and that application was a continuation-in-part of application Ser. No. 73,789, filed Dec. 5, 1960. This earlier application was abandoned after the filing of application Ser. No. 325,301.

This invention relates to the storage and using of film strips, and especially magnetic tape. It will be described as applied to magnetic tape, but it should be understood that many features of the invention can also be used for motion picture film.

One of the difficult problems in the uses of thin, magnetically sensitive, plastic tape for information, message, or entertainment use, is the storing and handling of long lengths of the tape. Conventionally the tape is spooled or wound, one layer on top of another, onto a flanged hub. About twelve hundred feet of the tape can be stored on a reel approximately seven inches in diameter.

It is an object of this invention to provide an improved device for the storage of long, thin plastic or paper tape, and a storage which does not require rewinding. Also the new tape handling device of this invention can be used in apparatus having a capstan and backup roller to provide tape motion at a constant velocity. It does not need threading during or after each use, and it can be operated at high tape velocities.

The invention relates particularly to tape cartridges which have the tape withdrawn from the inside of a coil and passed through a loop and across guide means back to the outside of the coil. The tape is of continuous length. Tape storage devices of this tape, in the past, have had a number of disadvantages; most of which have related to the feeding of the tape through the loops with the necessary tensions on the tape and without breaking or stretching the tape.

Another object of the invention is to provide novel means for withdrawing tape from the inside of the coil and feeding it through the loop and back to the outside convolution of the coil, in addition to the pull of the capstan when a capstan is used.

Other objects of the invention are to provide unitary and compact assemblies consisting of cartridges which include a housing having the coil and the driving means enclosed together within the cartridge and with convenient means for moving the loop across recording or reproducing heads which may be located outside of the cartridge or which may be projected into the cartridge through openings in one side of the cartridge housing.

Other objects, features and advantages of the invention will appear or be pointed out as the description proceeds.

*Brief description of the drawings*

In the drawing, forming a part hereof, in which like reference characters indicate corresponding parts in all the views.

*Description of preferred embodiments*

Figures 1, 2, 3:
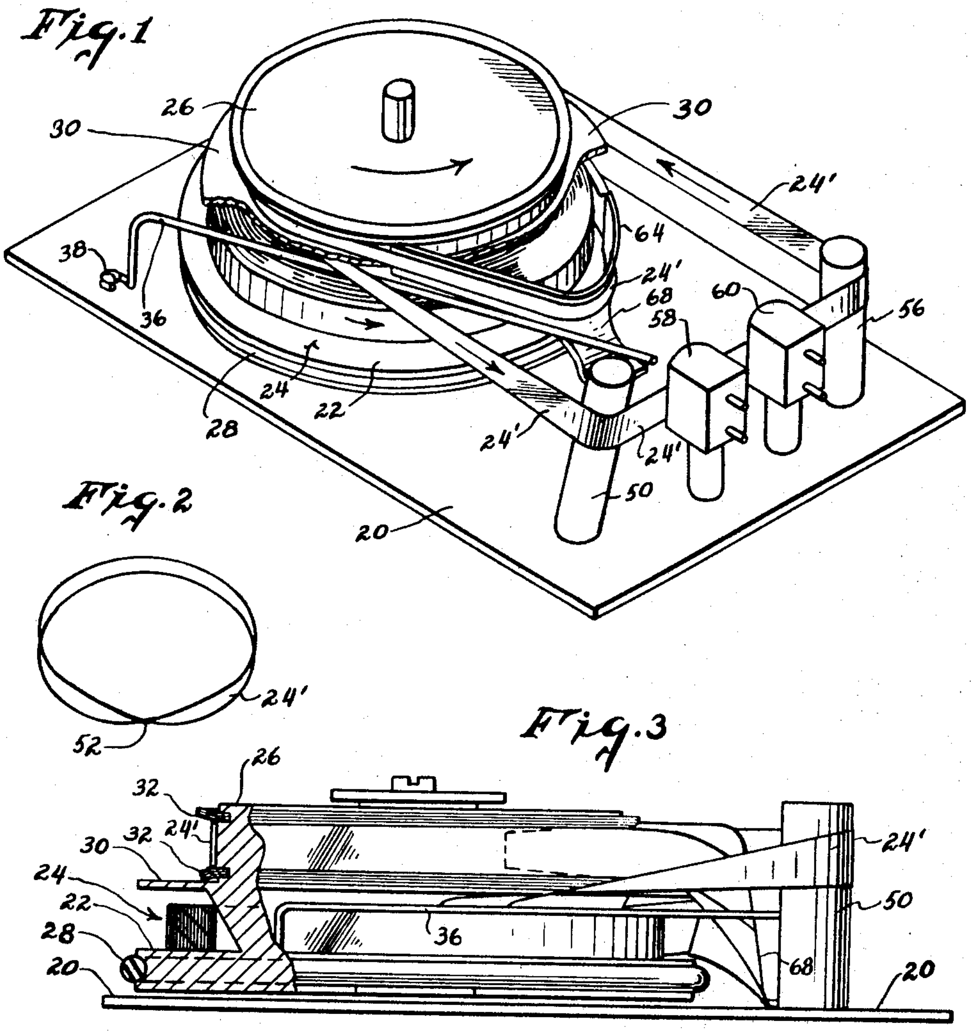
FIGURE 1 is a diagrammatic, perspective view showing a coil of tape carried on a support and with means for withdrawing it from the inside of the coil and passing it through a loop, past recording or reproducing heads and back to the outside of the coil in accordance with this invention.
FIGURE 2 is a diagrammatic view showing a Moebius loop which is used in the preferred construction of this invention.
FIGURE 3 is a side elevation, partly broken away in section, of the apparatus shown in FIGURE 1.
Figure 4:
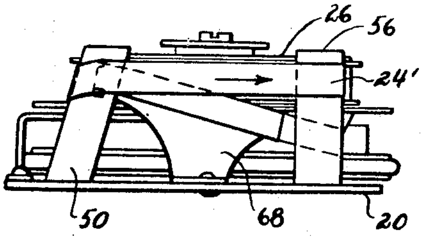
FIGURE 4 is an end view, on a reduced scale, of the apparatus shown in FIGURES 1 and 3.

FIGURE 1 shows a base 20 having a flange or support 22 for a coil 24 of film or magnetic tape. There is a drum 26 rotated above the coil 24, and the drum 26 is connected to the support 22, as shown in section in FIGURE 3.

Referring specifically to FIGURE 3, the support 22 has a circumferential groove for receiving a belt 28 that rotates the support 22, and the drum 26 is integrally connected with the support 22.

The portion of the support 22 which is rotated inside the coil 24 is of truncated conical contour and provides a sloping surface which tapers to a smaller diameter toward its lower end. This surface is useful in guiding the inside convolution of the coil 24 as it is withdrawn from the coil in a manner which will be explained.

There is a flange 30 located above the coil 24. The drum 26, above the flange 30, has resilient rims 32, which are spaced from one another by a distance slightly less than the width of the tape 24′. The tape displaces these rims 32 and thereby provides a pressure between the rims and the tape for obtaining a substantial friction by which the drum drives the tape 24′.

The effective coil diameter is at the point of contact of the inner convolution of the coil 24 with the conical surface of the support 22. This conical surface is provided to facilitate pulling the tape up and out of the center of the coil. The cone angle is important in determining the final direction the tape will assume after leaving the hub portion of the support 22. Being a continuous loop of the same piece of tape, the tape linear velocity must be the same at all places along its length regardless of its length, therefore, the effective diameter of the drum and the effective diameter of the hub portion of the support 22 must be the same if the tape is to run around both without slippage and with negligible tape tension.

By reducing slightly the diameter of the conical hub portion of the support 22 where it contacts with the coil 24 so that this diameter is slightly less than that of the drum 26, the tape is made to slip slightly on the tapered hub portion as the tape is pulled out. Thus a certain amount of tension is required to withdraw the tape. The smaller the effective diameter of the hub, compared to the drum, the greater will be the tape tension. This tape tension can be used to keep the tape in intimate contact with the magnetic recording or reproducing heads.

The conical surface of the hub can be made with a larger diameter so that the effective diameter where the inner convolution of the coil contacts with the hub is of greater diameter than the drum. The tape then feeds without tension. Without tape tension, some other means are used to hold the tape against the heads. It is, of course, important that the tape tension, where tension is used, be a constant amount regardless of the amount of tape on the coil. It must be essentially independent of the tape velocity.

To assure that the tape will always contact the conical surface of the hub at the same effective diameter, a guide wire 36 is provided for holding the coil 24 down on the underlying surface of the support 22 at all times. This guide wire 36 is secured to the base 20 by suitable means such as a screw 38.

Where tension of the tape 24′ comes from the coil under tension, this tension may be relied upon to obtain the necessary friction for preventing the tape from slipping on the drum 26. On a drum without the rims 32, and under conditions where the apparatus is not in operation, tension may not be sufficient to prevent slippage when the drum is initially started. In any installation where such conditions are encountered, auxiliary means may be provided for increasing friction of the tape 24′ against the drum 26. Instead of rims 32, a small rubber backup roller, such as the roller 44, shown in FIGURE 11, can be used. This roller has an axle 46 and is urged toward the drum 26′ by any suitable means to hold the tape 24′ against the drum with more friction. Actually the drum 26′ is a somewhat different construction than the drum 26 shown in FIGURES 1 and 3 as will be explained more fully in connection with FIGURE 10.

As the tape 24′ comes from the inside of the coil 24 to the first guide means comprising a stanchion 50, the tape 24 passes through a Moebius twist or loop 52. The principle of this Moebius loop is illustrated in FIGURE 2 where the length of the tape is shortened in order to better illustrate the construction. By providing this twist to the length of tape 24′, twice the playing time per lengh of tape is achieved. On the first time around, one side of the tape is against the face of the magnetic heads, and on the second time around, the other side is against the face of the heads.

This Moebius twist is located between the center of the coil 24 and tilted stanchion 50 attached to an extending upwardly from the base 20. If the tape 24′ from the coil hub were twisted in the opposite direction, the tape would not have the Moebius twist and the same side of the tape would always be in contact with the faces of the magnetic heads, regardless of the number of times the entire length of the tape traversed the heads.

The slope or tilt of the stanchion 50 is correlated with the angle of the conical surface of the hub of the support 22 and with the angle at which the run of tape 24′ rises from the coil 24 so as to obtain a horizontal run for the tape 24′ between the tilting stanchion 50 and a vertical stanchion 56 located on the other side of the base 20. This horizontal run of the tape 24′, between the stanchions 50 and 56 is the one which passes across recording or reproducing heads. In the construction shown, a recording head 58 is in contact with the tape 24′ just beyond the tilting stanchion 50 and a reproducing head 60 is located between the recording head 58 and the stanchion 56. This reproducing head 60 can be used as a play-back to reproduce the recording placed on the tape by the head 58.

The run 24′ beyond the tilting stanchion 50 is at the level of the drum 26. The tape 24′ passes from the stanchion 56 to the drum 26 and after passing around most of the circumference of the drum, the tape 24′ passes to a guide 64, which leads the tape downwardly again to the level of the coil 24 so that the tape wraps around the outside of the coil 24 to form an outer convolution of the coil. The guide 64 has a leg 68 which extends downwardly and is attached to the base 20.

One of the outstanding advantages of the construction shown in FIGURES 1 and 3 is that the drum 26 which move the tape 24′ is of much larger diameter than are the capstans used with conventional tape-recording reels. This large diameter gives the durm 26 a relatively slow rotational speed for a given tape velocity. This greatly reduces any variation in tape velocity as the result of eccentiricities in the drum or variations in the pressure of the tape against the drum, or dirt on the tape or drum surface.

Figures 5, 6, 6A, 7, 8, 9:
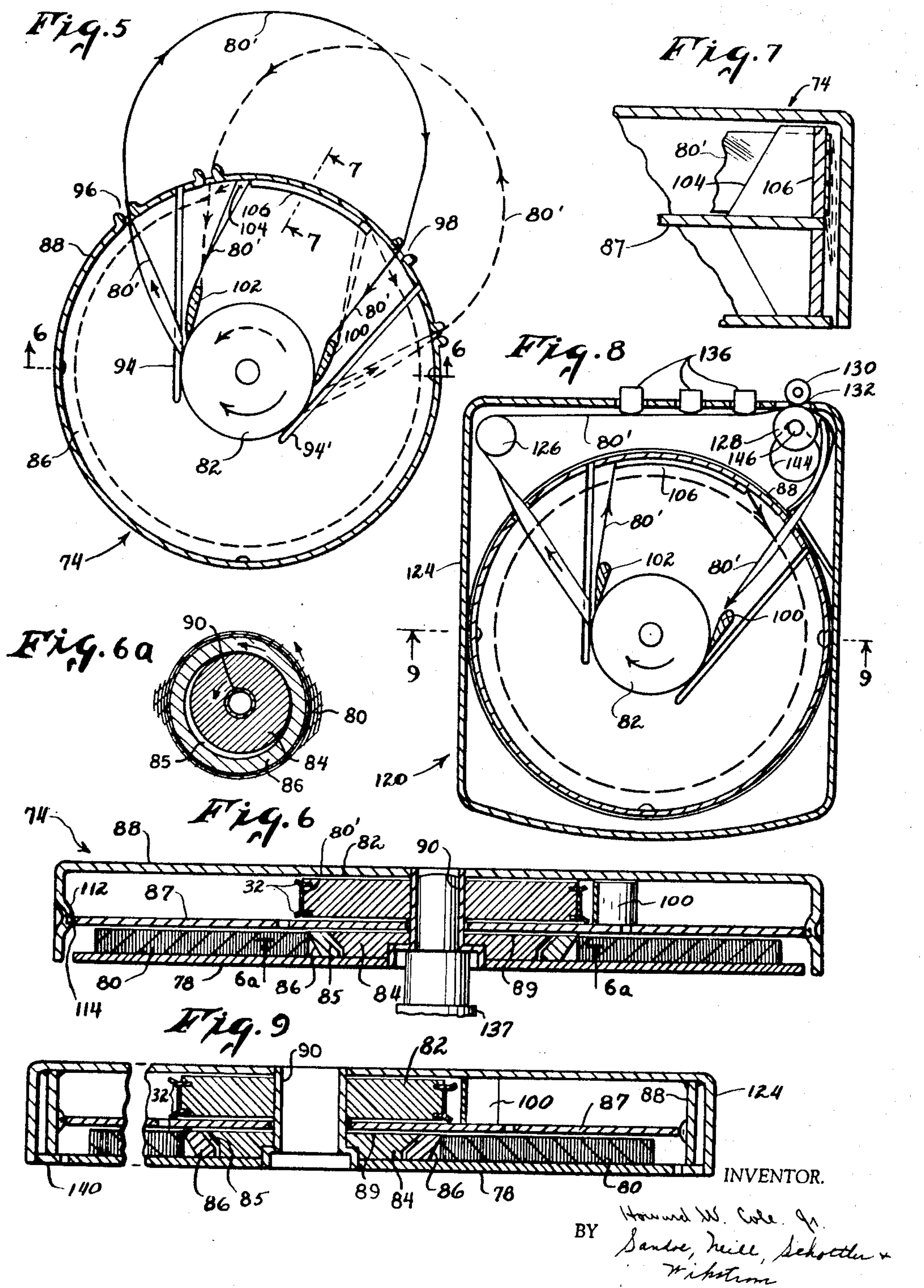
FIGURE 5 is a sectional view of a unitary cartridge embodying a modified form of the invention.
FIGURE 6 is a sectional view, on an enlarged scale, taken on the line 6—6 of FIGURE 5.
FIGURE 6*a* is a diagrammatic view illustrating the way in which the ring of FIGURE 6 rolls on the hub.
FIGURE 7 is a fragmentary sectional view, on a still larger scale, of a portion of the apparatus shown in FIGURE 5, the section being taken on the line 7—7 of FIGURE 5.
FIGURE 8 is a sectional view, similar to FIGURE 5, but showing a modified cartridge of the invention.
FIGURE 9 is an enlarged, sectional view taken on the line 9—9 of FIGURE 8.

FIGURES 5–7 show a unitary cartridge for more convenient handling of the tape with its support and driving drum in accordance with this invention. This cartridge can be completely contained within a seven-inch diameter so that it can be mounted in place of the conventional seven-inch take-up reel popular on commercial tape recorders.

The cartridge, FIGURES 5–7, indicated generally by the reference character 74, includes a flange or support 78, best shown in FIGURE 6, on which a coil 80 of tape rests. There is a drum 82 which is generally similar to the drum 26 of FIGURES 1 and 3, and the drum connects with a hub 84 which has a sloping circumferential face 85. A ring 86 surrounds the hub 84 and has an inside face confronting the face 85 of the hub and with a complementary slope. The inside diameter of the ring 86 at each level is somewhat larger than the outside diameter of the hub 84 at the same level.

The outside of the ring 86 has the same frusto-conical face as the support 22 previously described. The ring 86, however, gives the cartridge of FIGURE 6 a somewhat more flexible action in the winding and unwinding of tape under different operating conditions. FIGURE 6*a* shows the way in which the ring 86 can roll around the hub 84.

For example, when the ring 86 is stationary and a given length of film is fed back to the outside of the coil 80, an equal length of film is fed out from the inside of the coil as the coil turns with the flange 78.

The drum 82 has the rubber rims 32 for maintaining friction of the tape 80′ on the drum. The flange 87 fits into a circumferential groove 89 in the drum 82; and includes a housing 88 covering the entire top of the cartridge and extending downwardly around the circumferential side of the cartridge. There is a bushing 90 which extends through the hub 84 and drum 82 and to which the hub, and drum and the flange or support 78 are secured. This bushing 90 extends upwardly into the housing 88.

When the tape 80' is being used, the bushing 90 rotates and carries with it the support 78, the drum 82 and the hub 84, all of which rotate as a unit. The flange 87 and the housing 88 remain stationary and the circumferential groove 89 into which the inner edge of the flange 87 extends has sufficient running clearance for the hub 82 to turn without moving the flange 87.

FIGURE 5 shows the way in which the tape 80' passes from the inside of the coil 80 to an outside loop beyond the cartridge 74 and back into the cartridge and to the outside of the coil 80.

The tape 80' comes up from the space below the partition of flange 87 through a slot 94 and passes out of the cartridge through another slot 96 in the wall of the housing 88. The tape 80' follows the full-line contour past the recording or reproducing heads, not shown, and returns to the cartridge through a slot 98 in the housing.

Within the housing again, the tape 80' passes a guide 100 and from the guide follows around a part of the circumferential surface of the drum 82. The tape 80' is led away from the drum 82 by another guide 102 and from this guide the tape 80' passes across a sloping edge 104 of FIGURE 7 of another guide 106 which leads the tape downwardly past the circumferential edge of the flange 87 and to the level of the coil of tape below the flange 87 where the tape 80' wraps around the outside of the coil.

FIGURE 5 shows, in dotted lines, the way in which the tape 80' passes out of and back to the cartridge 74 when the direction of rotation of the drum is to be in the opposite direction. The full-line tape course, shown in FIGURE 5, corresponds to a clockwise rotation of the drum 82, as indicated by the full-line arrow on the drum; and the dotted-line course for the tape 80' indicates the course followed when the rotation of the drum is to be in a counterclockwise direction as indicated by the dotted arrow on the drum 82.

When threading the tape 80' through the various slots in the flange 87 and inside of the housing, it must be known whether the cartridge is being set up for clockwise or counterclockwise rotation. FIGURE 5 shows slots 94', 96' and 98' corresponding to the slots 94, 96 and 98 so that the cartridge can be threaded for rotation in either direction for the dotted-line course of the tape 80'. The most home recorders have counterclockwise rotation. The use of the cartridge 74 on a tape recorder will be described more fully in connection with FIGURE 12.

Referring again to FIGURE 6, the flange 87 is supported from the hub 84 by the circumferential groove 89 in the hub into which the flange 87 extends; but the flange 87 is held against rotation by indentations 112 which extend into notches 114 in the circumferential edge of the flange 87. The guide 100 is attached to the flange 87 and extends upwardly therefrom. The guide 102 (FIGURE 5) is also connected to the flange 87 but is not shown in FIGURE 6 because it is behind the drum 82.

FIGURES 8 and 9 show another modification of the invention in which a cartridge 120 is constructed so that the tape 80' never has to pass outside of the cartridge. The construction shown in FIGURES 8 and 9 is similar in many respects to that shown in FIGURES 5–7 and corresponding parts are indicated by the same reference characters. The cartridge 120 differs from the cartridge 74 however, principally in the providing of an outer housing 124 which completely encloses the housing 88 and which also encloses a guide 126. When the cartridge 120 is in operation there is also a backup roller 128 within the housing 124 over which the tape 80' passes and against which it is held by a capstan 130 located outside of the cartridge but extending into contact with the tape 80 through an opening 132 in the side wall of the housing 124. There are also recording or reproducing heads 136 which extend through openings in the side wall of the housing 124 which contact with the tape 80'.

After passing the capstan 130 and the back-up roller 128, the tape 80' passes into the inner housing 88 and around the guide 100 to the drum 82. The guide 102 leads the tape 80' to the guide 106 around which the tape travels to the level below the flange 87 and back to the outside of the coil in the manner already explained in connection with FIGURES 5–7. The capstan 130 advances the tape 80' past the heads 136 but does not drive the drum 82. The drive for the drum is from a separate source of power, preferably through a conventional slip clutch 137 to compensate for any differences in the lineal speed imparted to the tape by the capstan 130 and the drum 82.

The cartridge 120 (FIGURES 8–9) has a bottom 140 for the outer housing 124, and this bottom 140 covers substantially all of the lower part of the cartridge 120, except the part which is covered by the support 78. The bottom 140 is attached to the side wall of the housing 124 and remains stationary, whereas the support 78 rotates with the drum 82 in a manner already explained.

The backup roller 128 is not in the housing 124, except when the cartridge 120 is mounted on a recording or reproducing machine. There is an opening 144 in the bottom 140 of the housing 124 and this opening 144 is somewhat larger in diameter than the backup roller 128. The backup roller is introduced into the housing 124, by lowering the cartridge over the roller 128 so that the roller rises into the cartridge through the opening 144. The cartridge is then moved so as to bring the upper wall (FIGURE 8) toward the backup roller 128, and this brings the loop of the tape 80' to the contact with the backup roller.

There is an offset portion of the opening 144 to provide clearance for a shaft 146 by which the backup roller 128 is carried. After the cartridge is in position, with respect to backup roller 128, the recording or reproducing heads 136 are introduced into the cartridge through the openings provided for this purpose and the capstan 130 is brought into contact with the tape 80' on the side opposite the backup roller 128.

The preferred embodiment and a number of modifications have been illustrated and described, but changes and other modifications can be made and some features can be used in different combinations without departing from the invention as defined in the claims.

What is claimed is:

1. A tape cartridge including a support, a spiral reel of endless tape on said support and having a loop portion that extends from an inner convolution to an outside convolution of the spiral, partition means dividing the cartridge into a compartment, for the support and reel, and a chamber for the loop portion of the tape, guide means in contact with which the inner convolution of the reel passes directly and freely from the reel to said chamber, the cartridge having part of a wall of said chamber open for reception into the cartridge of a recording and reproducing head and at least a part of a capstan that contacts with the loop of tape to advance it past the recording or reproducing head, and a second driving means other than the capstan, located in the cartridge and including a drum with which the tape has frictional engagement as the tape travels from the capstan back to the outside of the reel on said support, the second driving means being connected with the support for the reel to rotate the support and the spiral reel of tape to advance the tape of the inner convolution toward said guide means and toward the recording and reproducing head, the speed of the second driving means being regulated and limited by the speed of travel of the tape as it comes from the capstan and frictionally engages the drum.

2. The tape cartridge described in claim 1 characterized by the cartridge having an opening through the bottom thereof exposing said second driving means for operation by power driving means including a slip clutch.

3. The tape cartridge described in claim 1 characterized by the support being a flange with an annular surface on which the spiral coil of tape rests, a part of the guide means being surrounded by the inner convolution of the coil and constituting a ring having a frustoconical peripheral surface that increases in diameter as it extends upward away from the flange, said ring being rotatable independently of the second driving means and constituting part of the guide means in contact with which the inner convolution passes from the reel, the second drving means other than the capstan including a hub at the center of the flange within the ring, and including also a socket in the bottom of the hub for receiving a driven element.

References Cited

UNITED STATES PATENTS

| | | | |
|---|---|---|---|
| 2,837,332 | 6/1958 | Busch. | |
| 2,951,654 | 9/1960 | Steelman. | |
| 3,030,041 | 4/1962 | Cousino. | |
| 3,065,310 | 11/1962 | Cross ------------ | 179—100.2 |
| 3,252,670 | 4/1966 | Smith. | |

BILLY S. TAYLOR, *Primary Examiner.*